United States Patent [19]

Nashiki et al.

[11] Patent Number: 5,055,760
[45] Date of Patent: Oct. 8, 1991

[54] LINEAR ACTUATOR DRIVE CONTROL APPARATUS

[75] Inventors: Masayuki Nashiki; Motozumi Yura, both of Ooguchi, Japan

[73] Assignee: Kabushiki Kaisha Okuma Tekkosho, Aichi, Japan

[21] Appl. No.: 483,465

[22] Filed: Feb. 22, 1990

[30] Foreign Application Priority Data

Feb. 28, 1989 [JP] Japan .................................. 1-48344

[51] Int. Cl.$^5$ ................................................. G05B 11/00
[52] U.S. Cl. ..................................... 318/687; 318/135; 318/640; 310/309
[58] Field of Search ............................... 318/560–636, 318/640, 687, 135; 310/12, 14, 19, 20–24, 26, 309, 90.5; 101/350, 148, 135, 365; 464/180

[56] References Cited

U.S. PATENT DOCUMENTS

| | | | |
|---|---|---|---|
| 4,087,729 | 5/1978 | Yamazaki et al. | 318/640 X |
| 4,359,289 | 11/1982 | Barrus et al. | 318/135 X |
| 4,456,934 | 6/1984 | Wedman et al. | 318/687 X |
| 4,754,185 | 6/1988 | Gabriel et al. | 310/309 |
| 4,808,901 | 2/1989 | Sakamoto | 318/135 X |
| 4,809,001 | 4/1985 | Wakabayashi et al. | 318/608 X |

Primary Examiner—Paul Ip
Attorney, Agent, or Firm—Wenderoth, Lind & Ponack

[57] ABSTRACT

The drive control apparatus for a linear actuator according to the present invention uses fine actuators, such as an electrostrictive element, so that it is possible to manufacture a linear actuator drive control apparatus obtaining big driving force in spite of a size considerably smaller than the conventional magnetic motor and linear motors utilized electromagnetic force. In addition, since the fine actuator and the driving base repeats their fixings and seperatings, it is possible to make the driven stroke range of the driving base wide. Since the fixing operation and the separating operation are carried out when the speeds of the fine actuator and of the driving base are almost the same, generation of the shock due to sudden speed change of the fine actuator and the driving base at the same of their fixing and separating is prevented, and it is possible to obtain smooth driving of the driving base. Control of the speeds of the fine actuator enables to finely and precisely control the speed of the driving base.

8 Claims, 15 Drawing Sheets

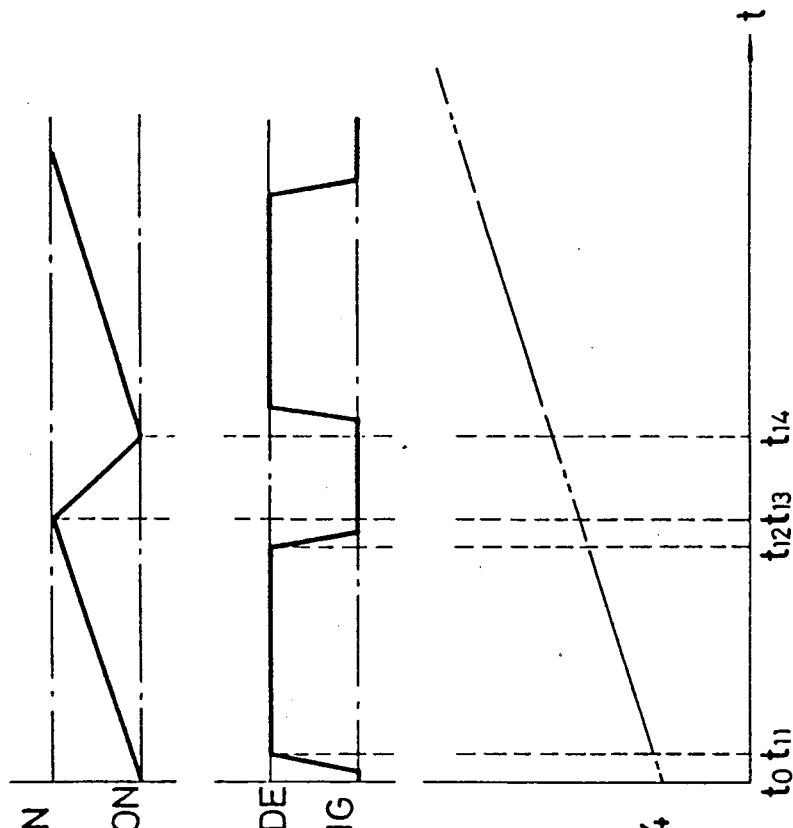

SPEED COMMAND
v* OF SLIDER 41

SPEED COMMAND $v_1^*$
& PRACTICAL SPEED
OF DRIVING FINE
ACTUATOR 31

FIXED COMMAND
SIGNAL SF OF
SLIDER 41

SPEED ACCORD
SIGNAL SJ

DISPLACEMENT OF
DRIVING FINE
ACTUATOR 31

DISPLACEMENT OF
FIXING/SEPARATING
FINE ACTUATOR 32

TIME IN WHICH
SLIDER 41 RECEIVE
DRIVE FORCE

FIG. 11A  PRIMARY UNIT DRIVING FINE ACTUATOR 31 {EXPANSION STATE / CONTRACTION STATE}
FIG. 11B  PRIMARY UNIT FIXING/SEPARATING FINE ACTUATOR 32 {FIXING MODE / SEPARATING MODE}
FIG. 11C  SECONDARY UNIT DRIVING FINE ACTUATOR 31 {EXPANSION STATE / CONTRACTION STATE}
FIG. 11D  SECONDARY UNIT FIXING/SEPARATING FINE ACTUATOR 32 {FIXING MODE / SEPARATING MODE}
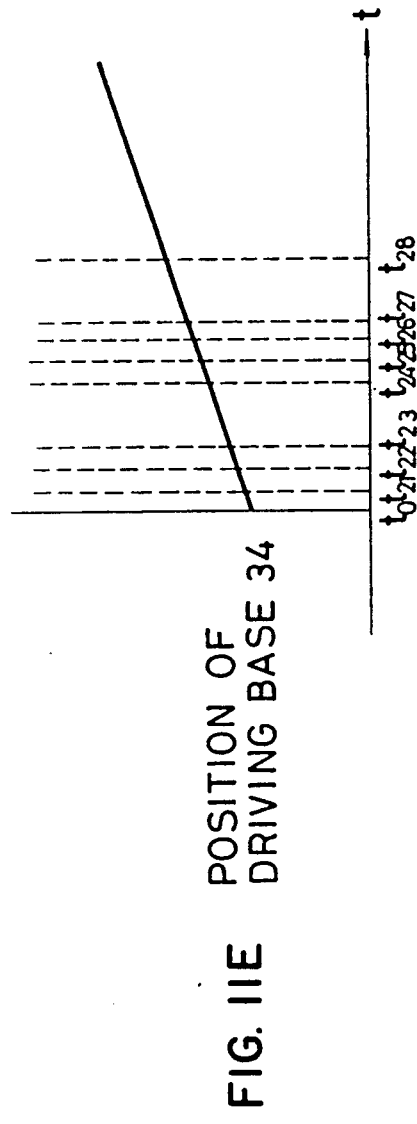
FIG. 11E  POSITION OF DRIVING BASE 34

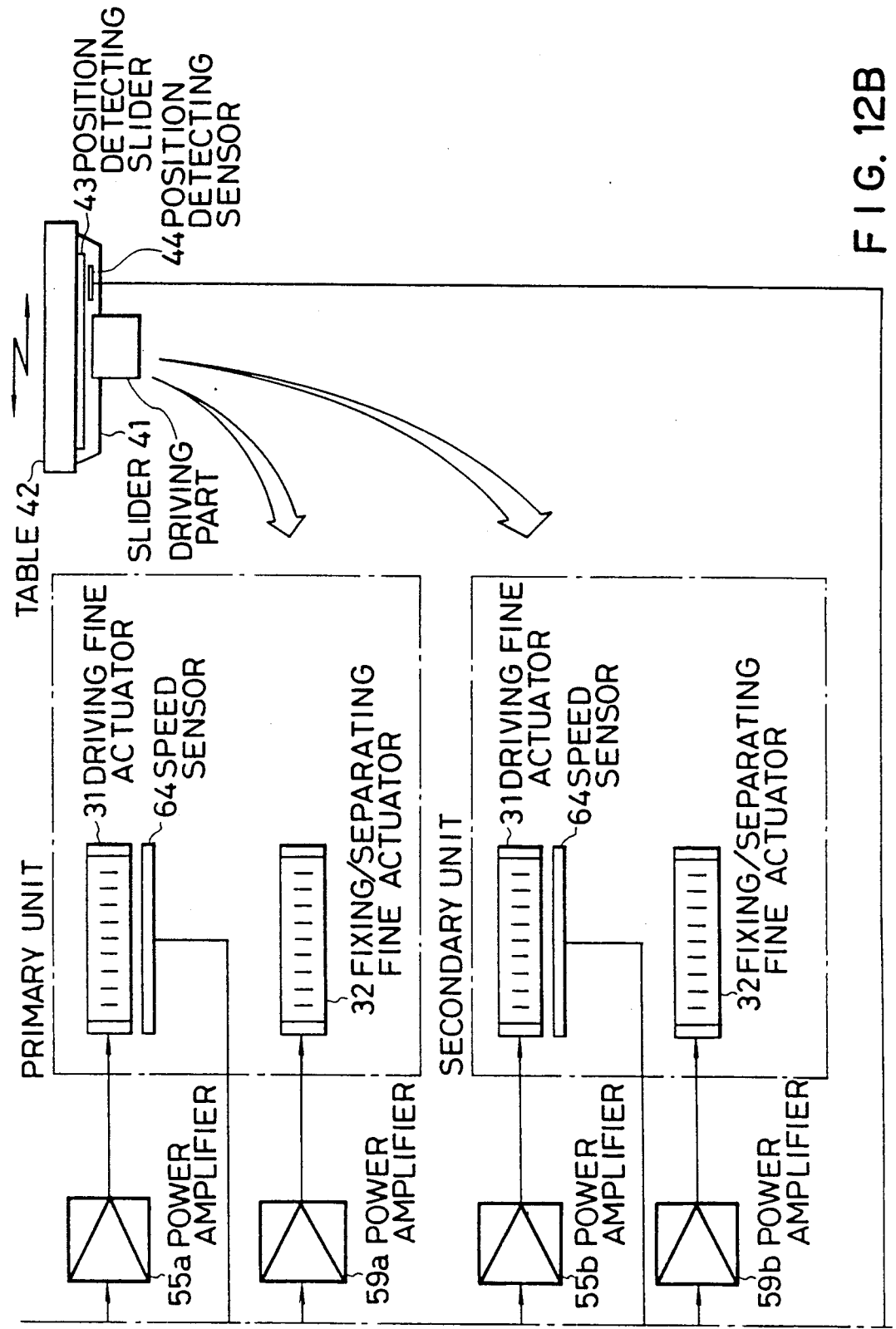
F I G. 12B

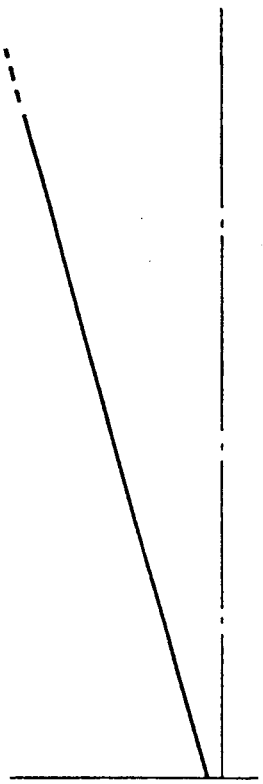
FIG. 13A  POSITIONAL COMMAND $P_1^*$ OF SLIDER 41
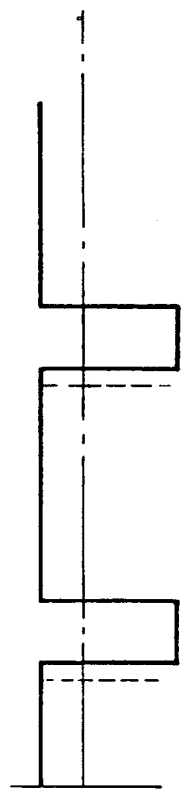
FIG. 13B  SPEED COMMAND $V_{1a}^*$ OF DRIVING FINE ACTUATOR 31
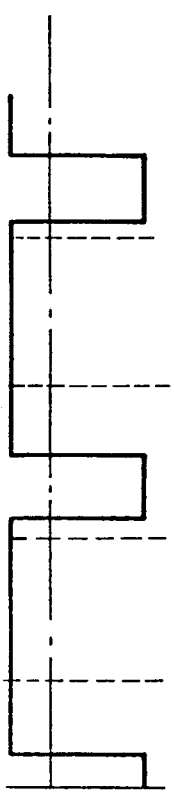
FIG. 13C  SPEED COMMAND $V_{1b}^*$ OF DRIVING FINE ACTUATOR 31
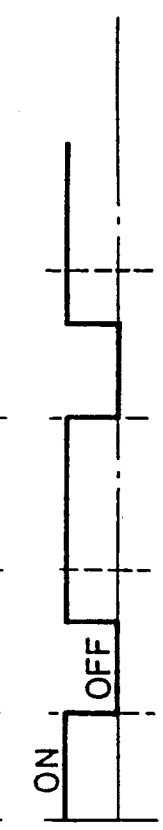
FIG. 13D  FIXED COMMAND SIGNAL $SF_a$ OF SLIDER 41
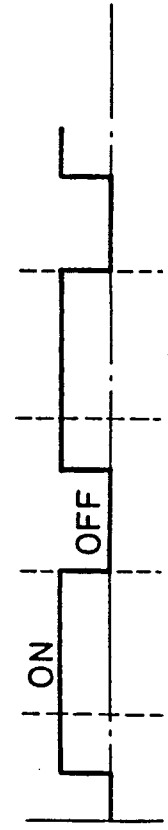
FIG. 13E  FIXED COMMAND SIGNAL $SF_b$ OF SLIDER 41

PRIMARY UNIT DISPLACEMENT OF DRIVING FINE ACTUATOR 31

PRIMARY UNIT DISPLACEMENT OF FIXING/SEPARATING FINE ACTUATOR 32

SECONDARY UNIT DISPLACEMENT OF DRIVING FINE ACTUATOR 31

SECONDARY UNIT DISPLACEMENT OF FIXING/SEPARATING FINE ACTUATOR 32

5,055,760

LINEAR ACTUATOR DRIVE CONTROL APPARATUS

BACKGROUND OF THE INVENTION

The present invention relates to a linear actuator drive control apparatus which can carry out precise velocity and positioning control.

Until now, there have been means for utilizing a motor or a linear motor, or means for utilizing fine actuators, such as piezoelectric elements, to accomplish precise linear drive.

FIG. 1 is a summarized cross-sectional view of one example of a means indirectly obtaining a linear driving force utilizing a motor. A rotational driving force obtained by a motor 1 is transferred to a ball screw 5 through pulleys 2 and 3 and a belt 4, converted into the linear driving force by a ball screw nut 6 into which the ball screw 5 is screwed, and linearly drives a driving base 8 through a supporting bracket 7.

FIG. 2 is a summarized cross-sectional view of one example of a means for directly obtaining a linear driving force utilizing a linear motor. A slider 131 of a linear motor 13, having a stator 132, is fixed to a driving base 11 through a supporting bracket 12 and the driving base 11 is linearly driven by the linear driving force of the linear motor 13.

FIG. 3 is a summarized cross-sectional view of one example of a means for directly obtaining a linear driving force utilizing fine actuators such as piezoelectric elements. Both ends of a cylindrical driving fine actuator 21 which can axially expand and contract are respectively fastened to side faces of fixing/separating fine actuators 22 and 23 like the fine actuator 21, and a rod-like driving base 24 is fastened to the side face of the fixing/separating fine actuator 22 so that its longitudinal axis is coincident with the direction of expansion and contraction of the driving fine actuator 21. In the actuator unit of such a structure, the driving base 24 runs through the side of a box-like supporting bracket 25, and the fixing/separating fine actuators 22 and 23 are housed in the supporting bracket 25 so that they support the inside face of the supporting bracket 25 in an expansion state and come apart from the inside face of the supporting bracket 25 in a contraction state.

FIG. 4 is a block diagram of one example of a driving apparatus of the linear driving means shown in FIG. 3. A position controlling circuit 414 inputs a velocity signal VS and outputs expansion/contraction signals SS3, SS4 and SS5 to each of drives 433, 434 and 435. Each driver 433, 434 and 435 supplies each of the expansion/contraction signals SS3, SS4 and SS5 to the respective fine actuators 21, 22 and 23 after power amplifications. An example of each of the expansion/contraction signals and each of the driver's outputs is shown by the time charts of FIGS. 5A-5D, and the velocity signal is in proportion to frequency of each of the expansion/contraction signals. Its operating sequence will be explained referring to the time charts shown in FIGS. 5A-5D as follows.

(1) Time $t_0$–Time $t_1$

The driving fine actuator 21 stops in the contraction state and the fixing/separating fine actuator 23 operates from the contraction state to the expansion state, i.e., from the condition that the fine actuator 23 separates from the inside face of the supporting bracket 25 (separating mode) to the condition that it supports the inside face of the supporting bracket 25 (fixing mode), and then the operation of the fixing/separating fine actuator 22 operates from the fixing mode to the separating mode. Therefore, the driving base 24 remains stopped.

(2) Time $t_1$–Time $t_2$

The driving fine actuator 21 operates from the contraction state to the expansion state under the conditions that the fixing/separating fine actuator 23 is in the fixing mode and the fixing/separating fine actuator 22 is in the separating mode. The fixing/separating fine actuator 22 and the driving base 24 fastened by this actuator 22 are driven by these conditions.

(3) Time $t_2$–Time $t_3$

The driving fine actuator 21 stops during the expansion state, and the fixing/separating fine actuator 22 operates from the separating mode to the fixing mode, and then the fixing/separating fine actuator 23 operates from the fixing mode to the separating mode. Therefore, the driving base 24 remains stopped.

(4) Time $t_3$–Time $t_4$

The driving fine actuator 21 operates from the expansion state to the contraction state under the conditions that the fixing/separating fine actuator 22 is in the fixing mode, and the fixing/separating fine actuator 23 is in the separating mode. The fixing/separating fine actuator 23 is driven, and the driving base 24 remains stopped by these conditions.

The above described sequence is one cycle of the operation of the linear driving means utilizing the conventional fine actuators.

In the above described linear driving means utilizing the motor, a mechanical converting mechanism, such as the ball screw, is always required to supply the linear driving force to the driving base 8. Therefore, there are problems in that precise movement cannot be attained because of mechanical strain or looseness of the converting mechanism, and the poorness of the transmission efficiency induced by the mechanical loss of the converting mechanisms. In addition, since the motor utilizes an electromagnetic force, a limitation naturally exists in the compactness because of the large size (the diameter and the length) of the motor is necessary in order to generate the appropriate torque.

In the above described linear driving means utilizing the linear motor, although the mechanical converting mechanism shown in FIG. 2 is not required and it is the compact mechanism, the length of a stator 132 opposite to the slider 131 of the linear motor 13 is required to be the length of one stroke to obtain the driving force over the whole stroke and it must be large because of its driving principle and is therefore expensive.

In the above described linear driving means utilizing the fine actuator, although it is a compact and simple mechanism, smooth movement cannot be obtained because of the intermittence of the movement of the driving base 24 repeatedly starting and stopping.

SUMMARY OF THE INVENTION

The present invention seeks to solve the above problems and the purpose of this invention is to provide a compact linear actuator drive control apparatus with high propulsion force which operates smoothly a high speed, and can be driven with a high accuracy and a high acceleration and deceleration.

According to one aspect of this invention, for achieving the object described above, there is provided a linear actuator drive control apparatus for moving a driving base, said apparatus comprising: at least one driving part provided with a fine actuating means adapted to alternatively affix the driving base to and to separate the driving base from said at least one driving part, said at least one driving part driving said driving base by said fine actuating means repeating sequentially said affixing and separating of the driving base and said at least one driving part, and a driving control means comprising a speed detecting means for detecting the speed of the driving base and a speed controlling means for controlling a speed of said fine actuating means in accordance with the detected speed of the driving base.

According to another aspect of this invention, for achieving the object described above, there is provided a linear actuator drive control apparatus for moving a driving base, comprising: at least one driving part provided with a fine actuating means adapted to alternatively affix the driving base to and to separate the driving base from said at least one driving part, said at least one driving part driving said driving base by said fine actuating means repeating sequentially said affixing and separating of the driving base and said at least one driving part, and a driving control means comprising a speed detecting means for detecting the speed of said fine actuating means and a speed controlling means for controlling a speed of said fine actuating means in accordance with its detecting speed.

The nature, principle and utility of the invention will become more apparent from the following detailed description when read in conjunction with the accompanying drawings.

BRIEF DESCRIPTION OF THE DRAWINGS

In the accompanying drawings:

FIGS. 5A-5D are time charts of the operating example of the means shown in FIG. 3;

FIGS. 5A-7C are time charts of the operating example of the driving part of the linear actuator drive control apparatus shown in FIG. 6;

FIGS. 11A-11E are time charts of the operating example of the driving part of the linear actuator drive control apparatus shown in FIG. 10;

FIGS. 13A-13I are time charts of the operating example of the drive control part of the linear actuator drive control apparatus shown in FIG. 12.

DESCRIPTION OF THE PREFERRED EMBODIMENTS

Figure 1:
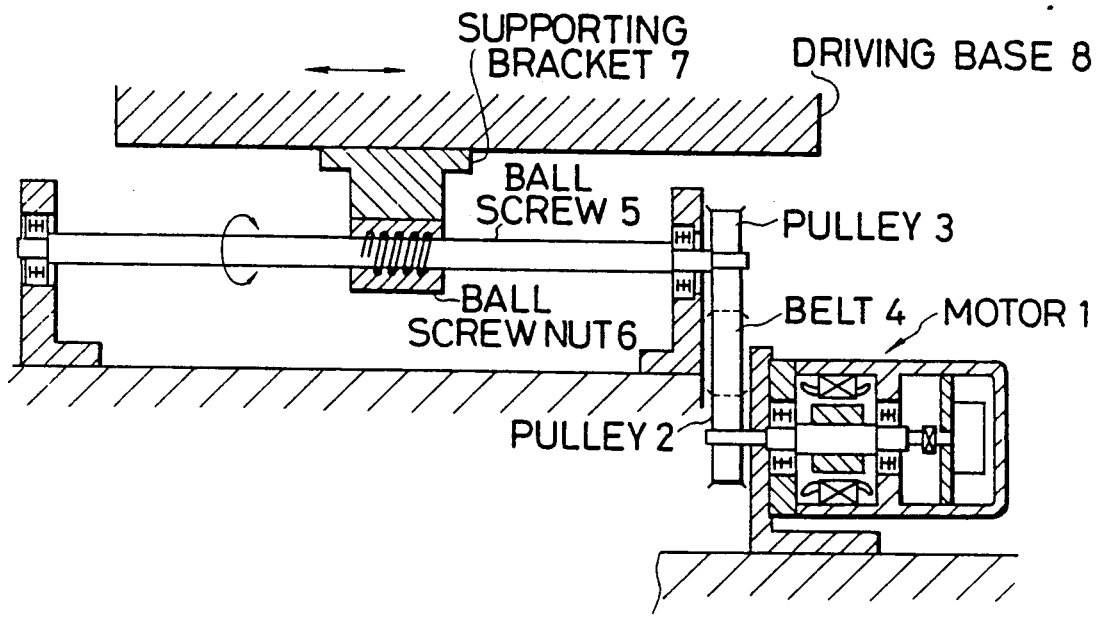
FIGS. 1 to 3 are diagrammatic perspective cross-sectional views of examples of the conventional means for achieving a linear driving force.
Figure 2:
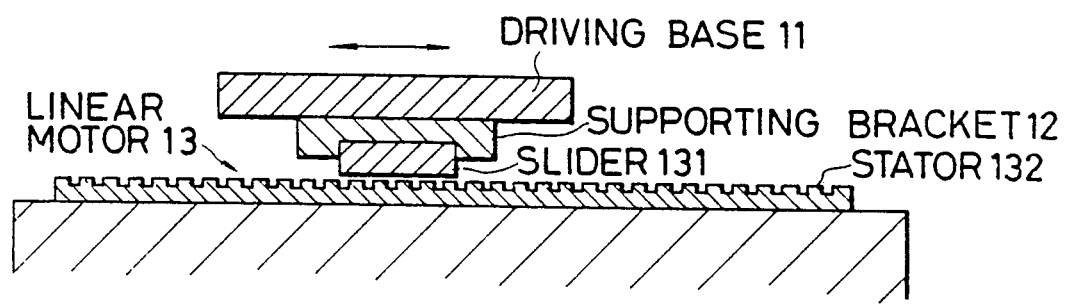
Figure 3:
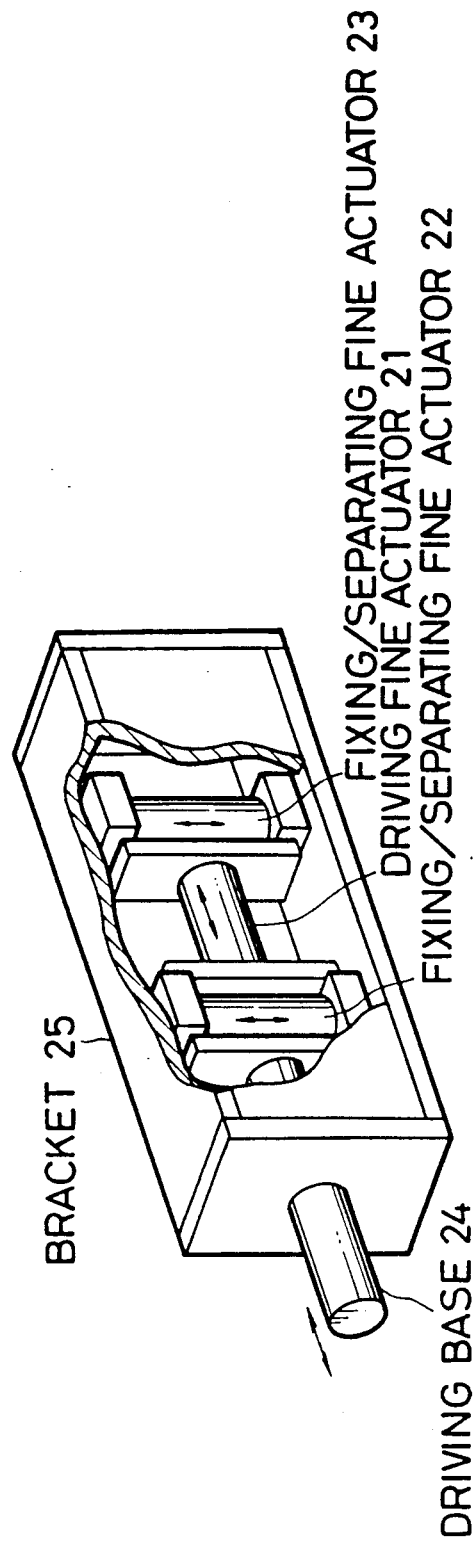
Figure 4:
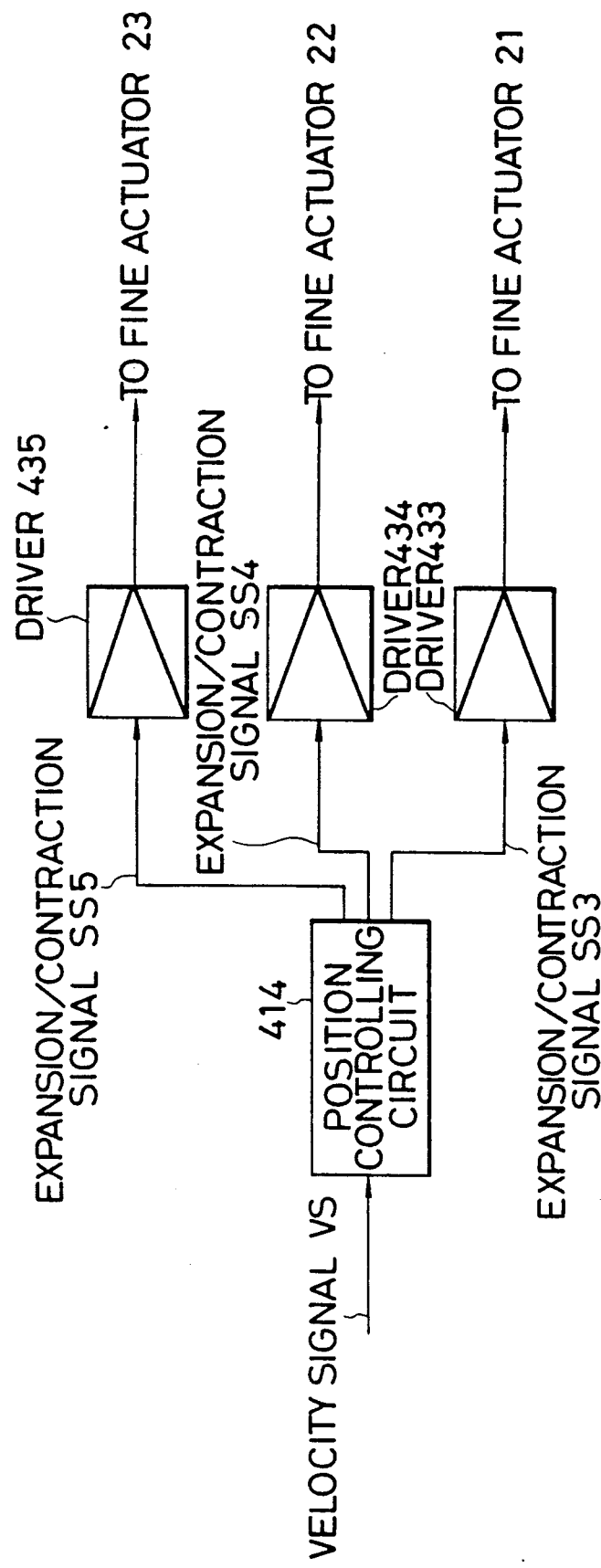
FIG. 4 is a block diagram of the driving apparatus shown in FIG. 3.
Figure 5:
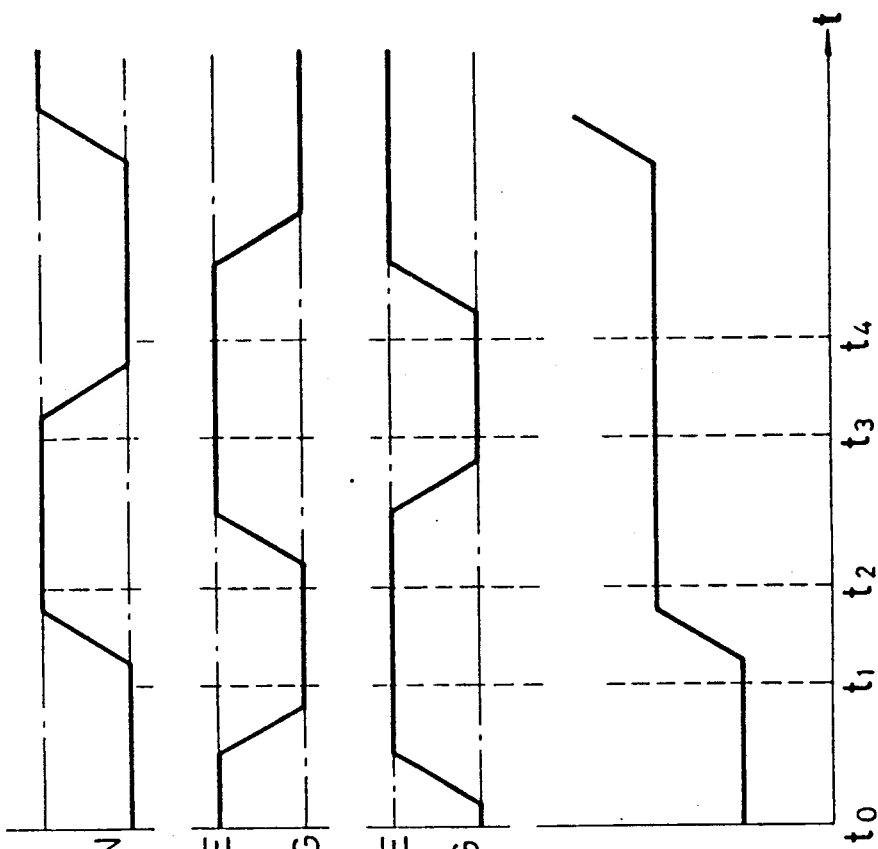
Figure 6:
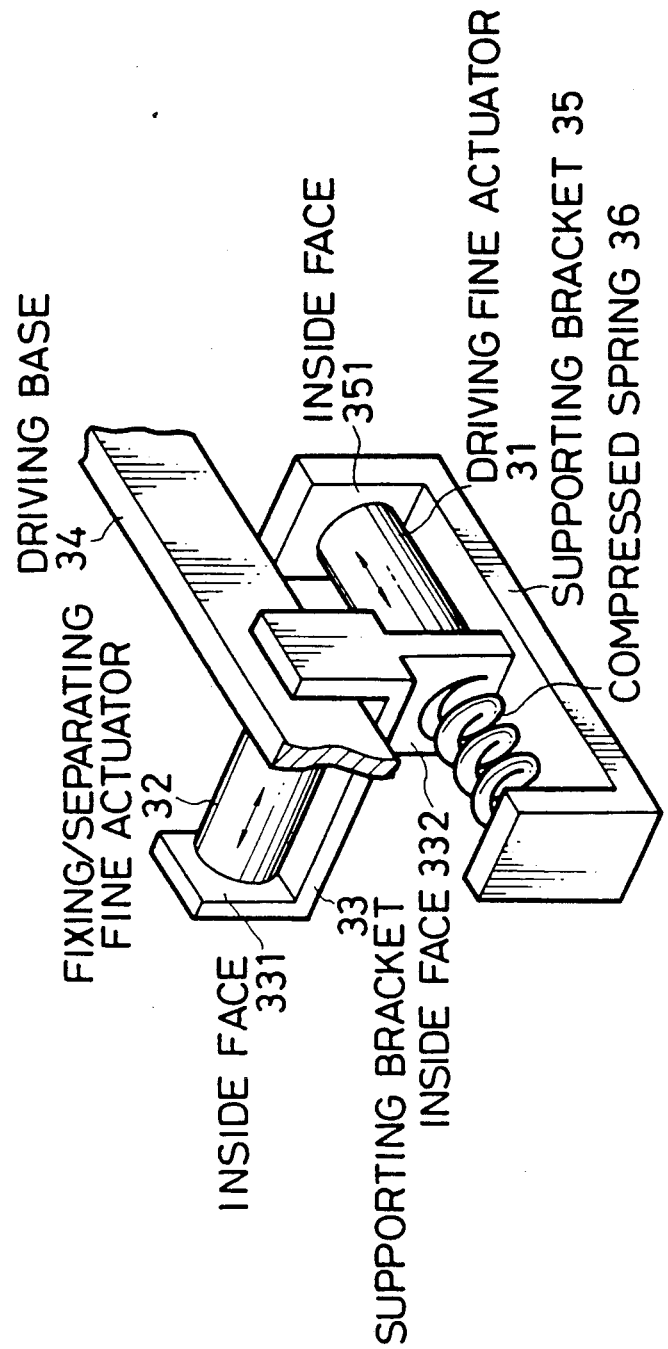
FIG. 6 is a perspective view of one example of the driving part of the linear actuator drive control apparatus of this invention.

FIG. 6 is a summarized perspective view of one embodiment of a driving part of a linear actuator drive control apparatus of the present invention. One end of a cylindrical fixing/separating fine actuator 32 which expands and contracts in the axial direction is fastened to one inside face 331 of a -shaped supporting bracket 33, and a rod-shaped driving base 34 is inserted between the other end of the fixing/separating fine actuator 32 and the other inside face of the supporting bracket 33. In addition, one end of the driving fine actuator 31 similar to the fixing/separating fine actuator 32 is fastened to one inside face 351 of another -shaped supporting bracket 35, and one end of a compressed spring 36 is fastened to the another inside face of the supporting bracket 35. Still more, a foot 332 of the supporting bracket 33 is pinched and fastened between the other end of the driving fine actuator 31 and the other end of the compressed spring 36 so that the expanding direction of the fixing/separating fine actuator 32 and that of the driving fine actuator 31 are orthogoral.

The operational sequence of this driving part of the linear actuator drive control apparatus is brought about as shown in the time charts of FIGS. 7A-7C, and is explained as follows.

(1) Time $t_o$–Time $t_{11}$

The driving fine actuator 31 operates from the contraction state to an expansion state, and the fixing/separating fine actuator 32 operates from a condition that the actuator 32 is separated from the driving base 34 (separating mode) to a condition that it supports the driving base 34 (fixing mode) at the time that the deflection of the moving velocity of the driving base 34 by the inertial force (later explained in detail) and the moving velocity of the driving fine actuator 31, i.e., the moving velocity of the supporting bracket 33, becomes less than or equal to the specified allowable value. The fixing/separating fine actuator 32 is in the fixing mode.

(2) Time $t_{11}$–Time $t_{12}$

Since the driving base 34 and the supporting bracket 33 are fixed by the fixing/separating fine actuator 32, the driving base 34 is precisely controlled and driven by the expanding operation of the driving fine actuator 31.

(3) Time $t_{12}$–Time $t_{13}$

The driving base 34 is separated from the supporting bracket 33 since the fixing/separating fine actuator 32 operates from the fixing mode to the separating mode. Therefore, although the driving force of the driving fine actuator 31 is not transferred to the driving base 34, the driving base 34 continues driving by the force of inertia.

(4) Time $t_{13}$–Time $t_{14}$

Since the fixing/separating fine actuator 32 is in the separating mode, the driving base 34 continues driving by the force of inertia. Still more, the fixing/separating fine actuator 32 and the supporting bracket 33 move to the direction opposite to the moving direction of the driving base 34 preparing for the next operating cycle by the operation of the driving fine actuator 31 from the expansion state to the contraction state.

The above described sequence is one cycle of the operation of one example of the driving part of the linear actuator drive control apparatus of the present invention. The driving base 34 can be thus moved an specific distance at an specific velocity without stopping by the continuous repetition of (1) to (4) steps.

Figure 8A:
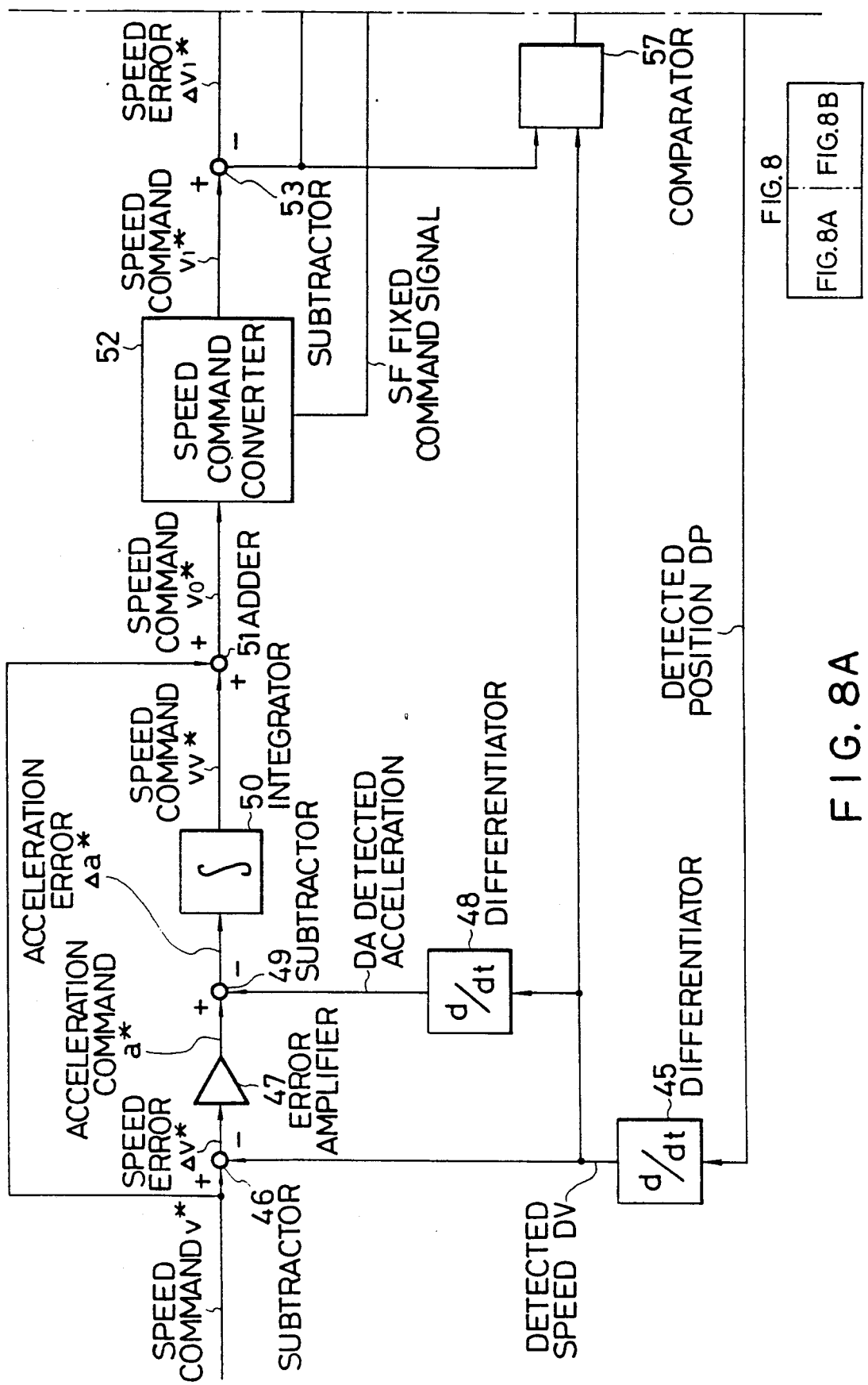
FIG. 8, consisting of FIGS. 8A and 8B taken together, is a block diagram of one example of the drive control part of the linear actuator drive control apparatus of this invention.
Figure 8B:
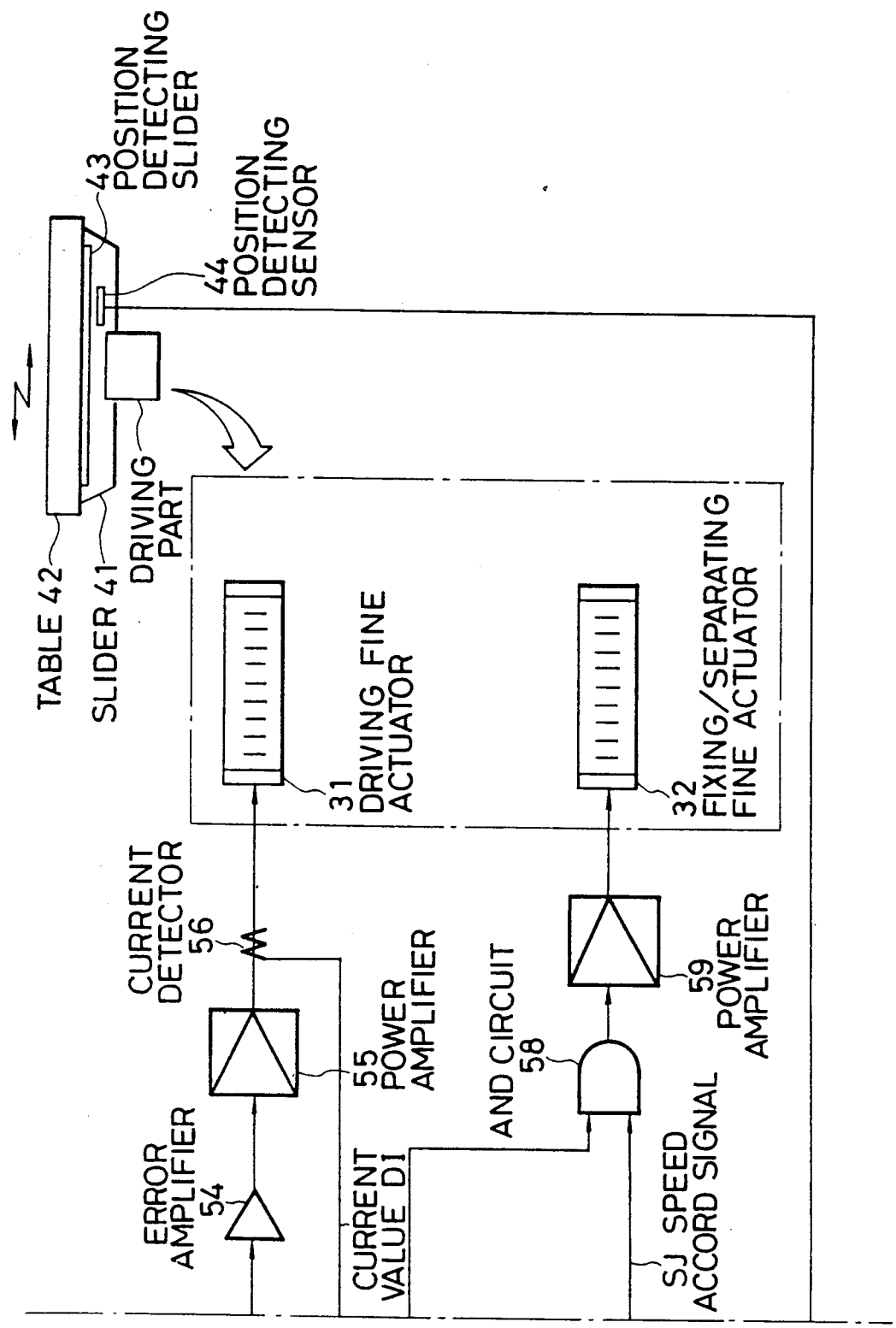
Figure 9A:
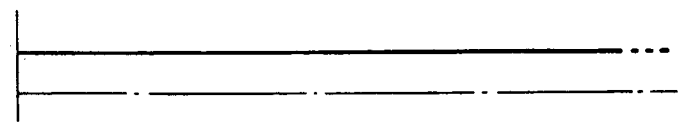
FIGS. 9A-9G are time charts of the operating example of the drive control part of the linear actuator drive control apparatus shown in FIG. 8.
Figure 9B:
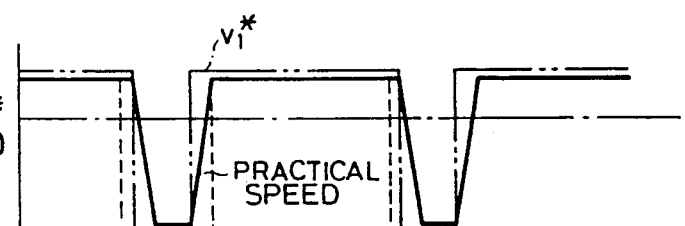
Figure 9C:
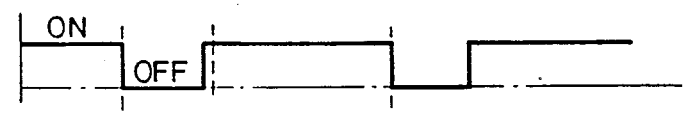
Figure 9D:
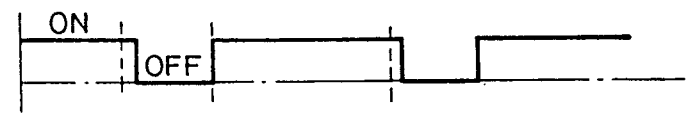
Figure 9E:
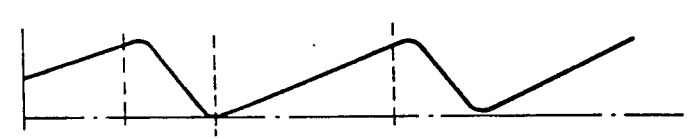
Figure 9F:
Figure 9G:
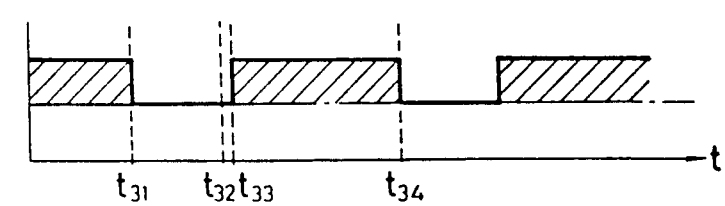

As shown in FIG. 8, consisting of FIGS. 8A and 8B taken together, and showing a block diagram depicting an embodiment of the drive control part for controlling driving motion of the driving part of the linear actuator drive control apparatus shown in FIG. 6, a position detecting slider 43 is applied to a table 42 fixed to a slider 41 of the driving base in order to detect the position of the table 42 through a position detecting sensor 44. A detected position DP the position detecting sensor 44 is differentiated in a differentiator 45 so as to generate a detected speed DV. A deviation, that is, a speed error $\Delta v^*$ between the detected speed DV and an externally inputted speed command $v^*$ of the slider 41 is calculated by a subtractor 46. An acceleration command $a^*$ is generated by amplifying the speed error $\Delta v^*$ through an error amplifier (for example, a Pi amplifier) 47, and a detected acceleration DA is generated by differentiating the detected speed DV obtained by the differentiator 45 through another differentiator 48, and the deviation, that is, an acceleration error $\Delta a^*$ between the acceleration command $a^*$ and the detected acceleration DA is calculated by another subtractor 49. The acceleration error $\Delta a^*$ is double integrated through an integrator 50 to generate a speed command $vv^*$. This speed command $vv^*$ and the externally inputted speed command $v^*$ are added by an adder 51 to generate a speed command $v_o^*$ which is then inputted to a speed command converter 52. In the speed command converter 52, the speed command $v_o^*$ is converted to a speed command $v_1^*$ for the driving fine actuator 31. A deviation, that is, a speed error $\Delta v_1^*$ between the speed command $v_1^*$ and a current value DI detected by a current detector 56 and flowing in the driving fine actuator 31 is calculated by the subtractor 53. The reasons for using the current value DI is that the current flowing through the electrostrictive element is proportional to the speed. The speed error $\Delta v_1^*$ is amplified through an error amplifier 54 and the amplified value is inputted to a power amplifier 55 whose output drives the driving fine actuator 31. A a comparator 57 determines whether or not the detected speed DV from the differentiator 45 is identical to a current value DI flowing in the driving fine actuator 31 and detected by the current detector 56, that is, the speed of the driving fine actuator 31. Then, a fixed command signal SF of the slider 41 from the speed command converter 52 and a speed accord signal SJ from the comparator 57 are inputted to an AND circuit 58. When an AND condition of both of the signals occurs, a driving command is inputted to a power amplifier 59 in order to drive the fixing/separating fine actuator 32.

In the preferred embodiment above of the present invention, it is necessary to carry out a double integration in order to determine the speed command $vv^*$ since an acceleration feedback is performed. However, if no acceleration feedback is performed then, merely an integration of the acceleration command $a^*$ can be used to generate the speed command $vv^*$.

An operation of the embodiment will be explained with reference to the timing charts shown in FIGS. 9A-9G. It is apparent that the speed command converter 52 outputs the speed command $v_1^*$ of the driving fine actuator 31 and the fixed command signal SF of the slider 41 on the basis of the speed command $v^*$ of the slider 41. The movable range, that is, the strokes of the fine actuator, such as an electrostrictive element and the like is limited, so that the speed command $v_1^*$ repeats at a fixed or almost fixed cycle to the plus or minus side, resulting in the fixed command signal SF of the slider 41 being turned OFF at the instant just before the speed command $v_1^*$ is inverted (for example, Time $t_{31}$, $t_{34}$). The practical speed of the driving fine actuator 31 follows the speed command $v_1^*$ with a small error that is, a delay, so the displacement of the driving fine actuator 31 repeats its expansion and contraction. When the practical speed of the driving fine actuator 31 is made identical with the speed command $v_1^*$ (for example, Time t32), the speed accord signal SJ is turned ON and the fixing/separating fine actuator 32 is driven to a fixing mode only during the time (for example, Time t32-t34) in which AND condition of the fixed command signal SF of the slider 41 and the speed accord signal SJ occur. As a result, the fixing/separating fine actuator 32 is displaced with some delay (for example, Time t33-t32) and the driving force of the driving fine actuator 31 is transferred to the slider 41 only during the time shown by the hatched portions (for example, Time t33-t34).

It is possible to determine the inverting timing of the speed command $v_1^*$ by using the stroke previously known of the fine actuator. Also it is possible to determine the inverting timing by checking whether or not the voltage being applied to a fine actuator exceeds the predetermined value.

Figure 10:
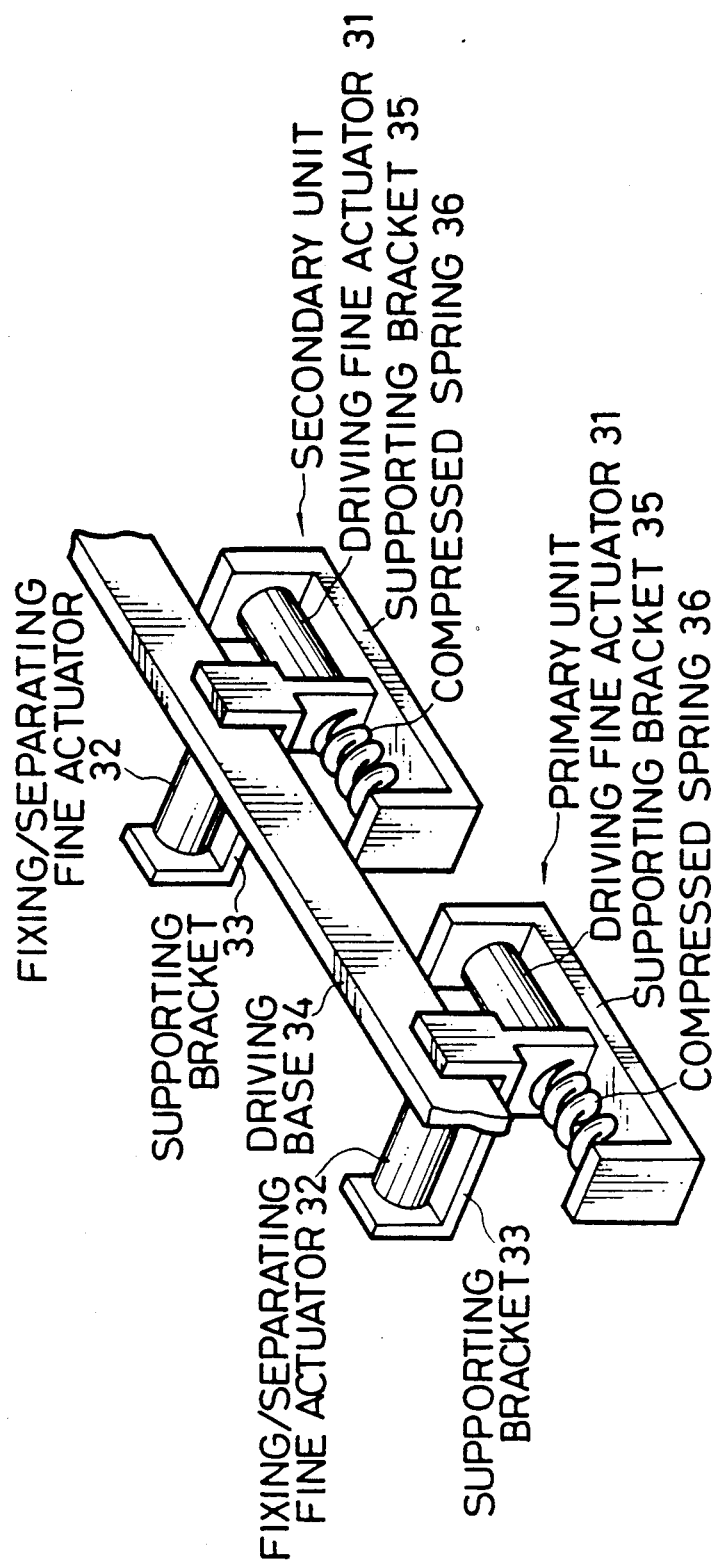
FIG. 10 is a perspective view of another example of the driving part of the linear actuator drive control apparatus of this invention.

FIG. 10 is a summarized perspective view of another embodiment of a driving part of a linear actuator drive control apparatus of this invention. Two driving parts (the primary unit and the secondary unit) shown in FIG. 6 are mounted forming a line.

The operating sequence of this driving part of the linear actuator drive control apparatus is as shown in the time charts of FIGS. 11A-11E, and is explained as follows.

(1) Time $t_0$-Time $t_{21}$

Since the driving base 34 and the supporting bracket 33 of the secondary unit are fixed by the fixing/separating fine actuator 32 of the secondary unit, the driving base 34 is driven by the expanding operation of the driving fine actuator 31 of the secondary unit. In this period, the driving fine actuator 31 of the primary unit operates from the contraction state to the expansion state, and the fixing/separating fine actuator 32 of the primary unit operates from the separating mode to the fixing mode at the time that the deflection of the moving velocity of the driving base 34 and the moving velocity of the driving fine actuator 31 of the primary unit, i.e., the moving velocity of the supporting bracket 33, becomes less than or equal to the specified allowable value. The fixing/separating fine actuator 32 of the primary unit is in the fixing mode.

(2) Time $t_{21}$-Time $t_{22}$

Since the driving base 34 and the supporting bracket 33 of the primary unit are fixed by the fixing/separating fine actuator 32 of the each unit, the driving base 34 is driven by the expanding operation of the driving fine actuator 31 of each unit.

(3) Time $t_{22}$-Time $t_{23}$

Since the driving base 34 and the supporting bracket 33 of the primary unit are fixed by the fixing/separating fine actuator 32 of the primary unit, the driving base 34 is driven by the expanding operation of the driving fine actuator 31 of the primary unit. In this period, the driving fine actuator 31 of the secondary unit operates from the contraction state to the expansion state, and the fixing/separating fine actuator 32 of the secondary unit operates from the fixing mode to the separating mode. Therefore, the driving force of the driving fine actuator 31 of the secondary unit is not transferred to the driving base 34 at the time that the fixing/separating fine actuator 32 of the secondary unit is in the separating mode.

(4) Time $t_{23}$–Time $t_{24}$

Since the driving base 34 and the supporting bracket 33 of the primary unit are fixed by the fixing/separating fine actuator 32 of the primary unit, the driving base 34 is driven by the expanding operation of the driving fine actuator 31 of the primary unit. In this period, the supporting bracket 33 and the fixing/separating fine actuator 32 of the secondary unit move to the direction opposite to the moving direction of the driving base 34 by the operation of the driving fine actuator 31 of the secondary unit from the expansion state to the contraction state.

(5) Time $t_{24}$–Time $t_{25}$

Since the driving base 34 and the supporting bracket 33 of the primary unit are fixed by the fixing/separating fine actuator 32 of the primary unit, the driving base 34 is driven by the expanding operation of the driving fine actuator 31 of the primary unit. In this period, the driving fine actuator 31 of the secondary unit operates from the contraction state to the expansion state, and the fixing/separating fine actuator 32 of the secondary unit operates from the separating mode to the fixing mode at the time that the deflection of the moving velocity of the driving base 34 and the moving velocity of the driving fine actuator 31 of the secondary unit, i.e., the moving velocity of the supporting bracket 33, becomes less than or equal to the specified allowable value. The fixing/separating fine actuator 32 of the secondary unit is in the fixing mode.

(6) Time $t_{25}$–Time $t_{26}$

Since the driving base 34, the supporting bracket 33 of the primary unit and the supporting bracket 33 of the secondary unit are fixed by the fixing/separating fine actuator 32 of each unit, the driving base 34 is driven by the expanding operation of the driving fine actuator 31 of each unit.

(7) Time $t_{26}$–Time $t_{27}$

Since the driving base 34 and the supporting bracket 33 of the secondary unit are fixed by the fixing/separating fine actuator 32 of the secondary unit, the driving base 34 is driven by the expanding operation of the driving fine actuator 31 of the secondary unit. In this period, the driving fine actuator 31 of the primary unit operates from the contraction state to the expansion state, and the fixing/separating fine actuator 32 of the primary unit operates from the fixing mode to the separating mode. Therefore, the driving force of the driving fine actuator 31 of the primary unit is not transferred to the driving base 34 at the time that the fixing/separating fine actuator 32 of the primary unit is in the separating mode.

(8) Time $t_{27}$–Time $t_{28}$

Since the driving base 34 and the supporting bracket 33 of the secondary unit are fixed by the fixing/separating fine actuator 32 of the secondary unit, the driving base 34 is driven by the expanding operation of the driving fine actuator 31 of the secondary unit. In this period, the supporting bracket 33 and the fixing-/separating fine actuator 32 of the primary unit are moved to the direction opposite to the moving direction of the driving base 34 by the operation of the driving fine actuator 31 of the primary unit from the expansion state to the contraction state.

The above described sequence is one cycle of the operation of another example of the driving part of the linear actuator drive control apparatus of the present invention. The driving base 34 can be thus precisely controlled so as to move a specific distance at a specific velocity without stopping and depending on the inertial force by the continuous repetition of (1) to (8). In addition, the moving direction of the driving base 34 can be changed to the opposite direction by the alteration of the operating velocity of the driving fine actuator 31 and the operation timing of the driving fine actuator 31 and the fixing/operating fine actuator 32. Furthermore, the maximum speed can be increased by the accumulation of a plurality of fine actuators operating in the same direction, i.e., operating the supporting bracket supporting the driving fine actuator driving the driving base by another driving fine actuator. Finally, the driving force can be increased by the driving of a plurality of lined-up driving fine actuators.

Figure 12A:
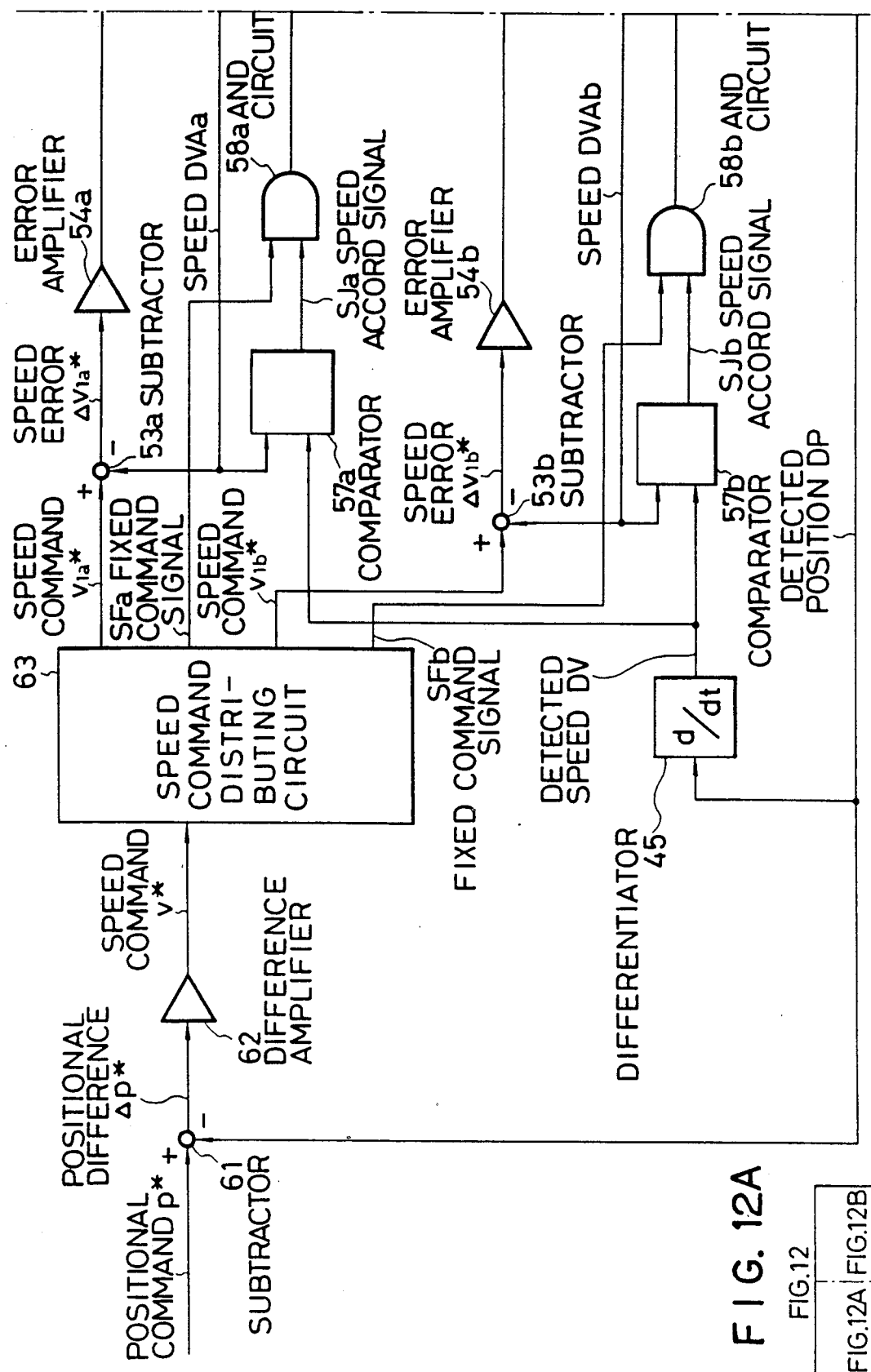
FIG. 12, consisting of FIGS. 12A and 12B taken together, is a block diagram of another example of the drive control part of the linear actuator drive control apparatus of this invention.
Figure 13F:
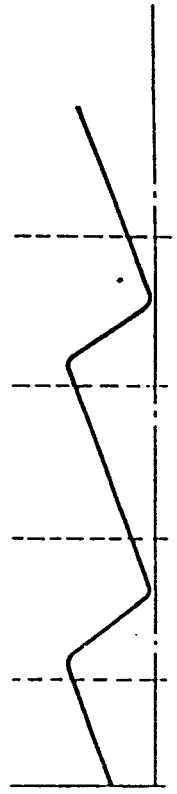
Figure 13G:
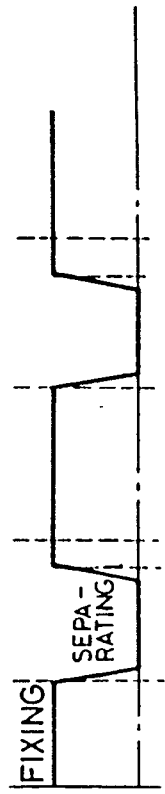
Figure 13H:
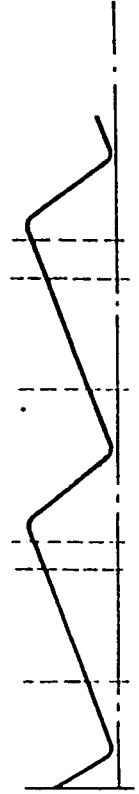
Figure 13I:
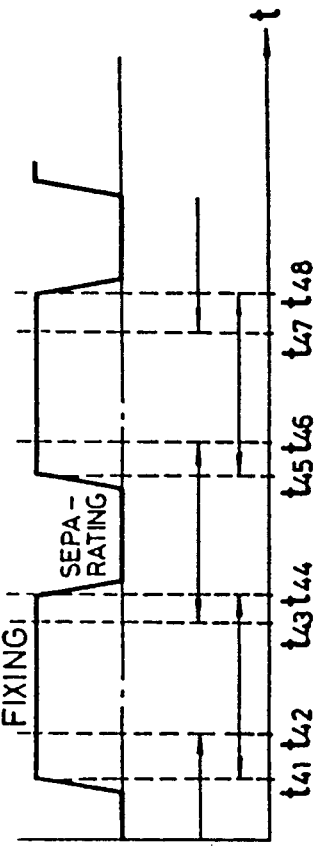

FIG. 12, consisting of FIGS. 12A and 12B taken together, is a block diagram showing an embodiment of the drive control part for controlling driving motion of the driving part of the linear actuator drive control apparatus. FIG. 12 corresponds to FIG. 8 and the same parts in both figures have the identical reference numerals or numbers with added letters "a" or "b", and an explanation of the identical parts has been omitted. In the drive control part of the linear actuator drive control apparatus, a deviation, that is, a positional difference $\Delta P^*$ between the detected position DP detected by the position detecting sensor 44 and a positional command $P^*$ according to the position of the slider 41 inputted from the outside is calculated by a subtractor 61. The positional difference $\Delta P^*$ is amplified by a difference amplifier 62 to generate the speed command $v^*$ which is then inputted to a speed command distributing circuit 63. The speed command $v_{1a}^*$ from the driving fine actuator 31 of a primary unit is inputted to the subtractor 53a. On the driving fine actuators 31 in the primary unit, a speed sensor 64 consisting of a displacement sensor, such as a strain sensor and the like and a differentiator are fixed. The speed DVAa of the driving fine actuator 31 in the primary unit, which is detected by each speed sensor 64 is adapted to be inputted to the subtractor 53a of the primary unit. The constitution of the secondary unit has the identical constitution of the primary unit.

An operation of the embodiment will be explained with reference to the timing charts shown in FIGS. 13A–13I. The speed command distributing circuit 63 outputs the speed commands $v_{1a}^*$ and $v_{1b}^*$ of the driving fine actuators 31, 31 of respective units and fixed command signals SFa and SFb of the slider 41 at some intervals (for example, Time t44–t42), so that driving forces for the driving fine actuators 31, 31 of respective units are transferred alternatively to the slider 41 (for example, a driving force of the primary unit is shown by the arrow between Time t43 and t46, a driving force of the secondary unit is the arrow between Time t41 and t44 and Time t45 and t48). Thus, it is possible to obtain a continuous driving force to be transferred to the slider 41.

Since the linear actuator drive control apparatus of this invention can obtain an operation with a high driving force, a high-speed, a high-accuracy and the capability of a high acceleration and deceleration in spite of its compactness as described above, when this linear actuator is used, for example, in machine tools, they can be miniaturized, and be high by accuracy and can be economical.

It should be understood that many modifications and adaptations of the invention will become apparent to those skilled in the art and it is intended to encompass such obvious modifications and changes in the scope of the claims appended hereto.

What is claimed is:

1. A linear actuator drive control apparatus for moving a driving base, said apparatus comprising: at least one driving part provided with a fixing and separating fine actuating means for alternatively affix the driving base and to separate the driving base from said at least one driving part, said at least one driving part driving said driving base by said fixing and separating fine actuating means repeating sequentially affixing and separating of the driving base and said at least one driving part, and a driving control means comprising a speed detecting means for detecting the speed of the driving base and a speed controlling means for controlling a speed of said fine actuating means in accordance with the detected speed of the driving base.

2. A linear actuator drive control apparatus according to claim 1, wherein said at least one driving part further comprises a position detecting means for detecting the position of the driving base.

3. A linear actuator drive control apparatus according to claim 1, wherein said speed controlling means further comprises an acceleration controlling means for controlling an acceleration of said fixing and separating fine actuating means.

4. A linear actuator drive control apparatus according to claim 1, wherein affixing of said at least one driving part to the driving base by said fixing and separating fine actuating means is effected when a deviation between the speed of said fixing and separating fine actuating means and the driving base becomes less than a predetermined permittable value.

5. A linear actuator drive control apparatus for moving a driving base, said apparatus comprising: at least one driving part provided with a fixing and separating fine actuating means for alternatively affix repeating the driving base and to separate the driving base from said at least one driving part, said at least one driving part driving said driving base by said fixing and separating fine actuating means repeating sequentially affixing and separating of the driving base and said at least one driving part, and a driving control means comprising a speed detecting means for detecting the speed of said fixing and separating fine actuating means and a speed controlling means for controlling a speed of said fixing and separating fine actuating means in accordance with the detected speed.

6. A linear actuator drive control apparatus according to claim 5, wherein said at least one driving part further comprises a position detecting means for detecting the position of the driving base.

7. A linear actuator drive control apparatus according to claim 5, wherein said speed controlling means further comprises an acceleration controlling means for controlling an acceleration of said fine actuating means.

8. A linear actuator drive control apparatus according to claim 5, wherein affixing of said at least one driving part to the driving base by said fixing and separating fine actuating means is effected when a deviation between the speed of said fixing and separating fine actuating means and the driving base becomes less than a predetermined permittable value.

* * * * *